UNITED STATES PATENT OFFICE.

OTIS HUTCHINS, OF NIAGARA FALLS, NEW YORK, ASSIGNOR TO THE CARBORUNDUM COMPANY, OF NIAGARA FALLS, NEW YORK, A CORPORATION OF PENNSYLVANIA.

METHOD OF PRODUCING SILICON-CARBID ARTICLES.

1,266,478.           Specification of Letters Patent.     Patented May 14, 1918.

No Drawing.     Application filed March 3, 1917. Serial No. 152,242.

*To all whom it may concern:*

Be it known that I, OTIS HUTCHINS, a citizen of the United States, residing at Niagara Falls, in the county of Niagara and State of New York, have invented a new and useful Improvement in the Methods of Producing Silicon-Carbid Articles, of which the following is a full, clear, and exact description.

This invention relates to the manufacture of silicon carbid in a dense, compact state in the form of crucibles, tubes, rods, muffles, plates and dishes. This new form of silicon carbid is particularly useful as a refractory in the form of crucibles, muffles and tubes, as an electrical resistance material in the form of rods and slabs and as a chemically resistant material in the form of pipes, evaporating dishes, filter plates and other special shapes.

When molded articles composed of silicon carbid and carbon are heated to a high temperature in an atmosphere containing silicon and silica vapor, the articles are converted more or less completely into dense silicon carbid, this conversion working in from the surface.

The depth of this conversion and the nature of the silicon carbid formed depends upon several factors, such as the amount and form of carbon present, the porosity of article, and the nature and temperature of the furnace atmosphere. Under the most favorable conditions, it has been found difficult to manufacture dense silicon carbid articles of considerable thickness.

I have discovered that to get the most favorable results in this process, it is necessary to work with mixtures relatively free of free carbon, also relatively free of silica, and preferably containing some free silicon. Also that the bond should consist of an organic compound which, upon heating, leaves a considerable amount of carbon residue. One bond of this type is coal tar pitch. I have found it possible, working as explained above, to convert into dense silicon carbid articles up to a thickness of one and five-eighths inches, and this thickness can no doubt be exceeded. The preferred way of carrying out my process is as follows:

I thoroughly mix my silicon carbid powder, preferably ground to a fine state of subdivision, with fine powdered silicon. The silicon carbid powder should preferably contain about ninety-five per cent. SiC and the silicon may be ordinary grade silicon metal containing about ninety per cent. Ci. These ingredients are mixed with pitch or other organic binder, and the mass heated and stirred until of correct plasticity for working. The amount of silicon used varies with the quality of the article desired, and I have obtained good results with proportions of from three per cent. to twenty per cent. These mixtures have marked plastic properties which make possible the forming of articles by several methods. As an example a mixture containing twenty per cent. coal tar pitch (m. p. 170° F.) three per cent. silicon and seventy-seven per cent. silicon carbid powder, when heated to about 200° F., with constant stirring, acquires a suitable plasticity for working by any of the well known methods of molding plastic bodies. The mixture may be placed in a heated mold and subjected to pressure sufficient to form it into shape of the article required. The mixture may be tamped into molds, and articles of intricate shape thus formed. The mixture may be squirted through a die, forming rods or tubes. The mixture may also be worked by hand, by methods essentially the same as employed in the pottery industry.

Articles formed as above described are heated very slowly in a neutral or reducing atmosphere sufficiently to drive off the volatile matter of the binder. After this heating or baking, the articles consist of silicon carbid powder with a small amount of silicon, held together by a matrix of carbon. This carbon completely surrounds the silicon carbid and silicon and cements the whole mass together. The structure is entirely different from an article made of a mixture of carbon, silicon carbid and a binder like glue water which deposits little carbon upon heating.

For the conversion of these articles into dense silicon carbid, an electric furnace is used of the type ordinarily employed in the production of carborundum.

Two or more heating cores are generally used to produce a more uniform distribution of heat. The silicon carbid articles are placed between the cores and embedded in a mixture of silica and carbon or silicon carbid and silica, or any mixture may be used which gives, upon heating, a silicon-containing atmosphere. The furnace is brought up to the temperature of the formation of carborundum at which temperature vapors of silica and silicon are formed and constitute a part of the furnace atmosphere.

When the vapors come in contact with the carbonaceous matter which holds together the silicon carbid particles within the article, they react with the carbon and change it into silicon carbid. If silicon were originally placed in the article, it is vaporized and assists in the reaction. The carbon matrix is converted *in situ* into silicon carbid and the resultant article is a solid dense homogeneous mass which shows a continuity of structure.

I may, if desired, carry out both the baking and converting processes as one furnace operation. In this case, I place the molded articles directly in the carborundum type furnace and heat very slowly for several days. This slow heating can easily be controlled by regulating the amount of electrical energy supplied to the furnace. After the articles are thoroughly baked, then without allowing the furnace to cool, the power supplied to the furnace is increased and the temperature raised sufficiently to convert the article into dense silicon carbid.

I claim:

1. The method of making articles of dense silicon carbid, which consists in shaping said articles of a mixture containing silicon carbid and an organic binder of such a nature that upon heating a large residue of carbon remains to serve as a matrix surrounding each particle of the silicon carbid, baking the articles slowly in a neutral or reducing atmosphere to expel the volatile matter of the binder and convert it into a carbon matrix in which the particles of silicon carbid are embedded and held together, and finally heating the articles thus formed in an atmosphere of silicon and silica vapors to a temperature sufficient to convert the carbon into silicon carbid, thereby converting the carbon matrix *in situ* into silicon carbid and producing a homogeneous mass having a continuous structure.

2. The method of making articles of dense silicon carbid, which consists in shaping the articles of a mixture of silicon carbid, silicon and an organic binder of such a nature that upon heating a large residue of carbon remains to serve as a matrix surrounding each particle of the silicon carbid and silicon, baking the articles slowly in a neutral or reducing atmosphere to expel the volatile matter of the binder and convert it into a carbon matrix in which the particles of silicon carbid and silicon are embedded and held together, and finally heating the articles thus formed in an atmosphere of silicon and silica vapors to a temperature sufficient to convert the carbon into silicon carbid, thereby converting the carbon matrix *in situ* into silicon carbid and producing a homogeneous mass having a continuous structure.

3. The method of making articles of dense silicon carbid, which consists in shaping said articles of a mixture containing silicon carbid and a binder of coal-tar pitch, baking the articles slowly in a neutral or reducing atmosphere to expel the volatile matter of the binder and convert it into a carbon matrix in which the particles of silicon carbid are embedded and held together, and finally heating the articles thus formed in an atmosphere of silicon and silica vapors to a temperature sufficient to convert the carbon into silicon carbid, thereby converting the carbon matrix *in situ* into silicon carbid and producing a homogeneous mass having a continuous structure.

4. The method of making articles of dense silicon carbid which consists in shaping the articles of a mixture of silicon carbid, silicon and a binder of coal-tar pitch, baking the articles slowly in a neutral or reducing atmosphere to expel the volatile matter of the binder and convert it into a carbon matrix in which the particles of silicon carbid and silicon are embedded and held together, and finally heating the articles thus formed in an atmosphere of silicon and silica vapors to a temperature sufficient to convert the carbon into silicon carbid, thereby converting the carbon matrix *in situ* into silicon carbid and producing a homogeneous mass having a continuous structure.

5. The method of making articles of dense silicon carbid, which consists in shaping the articles of a mixture of silicon carbid, silicon and an organic binder of such a nature that upon heating a large residue of carbon remains to serve as a matrix surrounding each particle of the silicon carbid and silicon, embedding the articles in a mixture of silica and carbon or a mixture of silica or silicon carbid in a carborundum type electric furnace, heating the articles slowly to expel the volatile matter of the binder and convert the binder into a carbon matrix in which the particles of silicon carbid and silicon are embedded and held together, and finally increasing the temperature of the furnace sufficiently to convert the carbon matrix *in situ* into silicon carbid and thereby produce a dense homogeneous mass having a continuous structure.

6. In the herein described method of making articles of dense silicon carbid, the steps which consist in molding an article of a mixture containing silicon carbid powder and an organic binder of such a nature that upon heating a large residue of carbon remains to serve as a matrix surrounding each particle of the silicon carbid, and baking the articles slowly in a neutral or reducing atmosphere to expel the volatile matter of the binder and convert it into carbon whereby a form is produced consisting of a stiff matrix of carbon having particles of silicon carbid embedded and supported therein.

7. As a new article of manufacture, a molded form consisting of particles of silicon carbid and silicon embedded and held together by a matrix of carbon.

In testimony whereof, I have hereunto set my hand.

OTIS HUTCHINS.

Witnesses:
 FRANK J. TONE,
 S. J. SEVERIN.